(12) United States Patent
Fromage et al.

(10) Patent No.: US 9,227,091 B2
(45) Date of Patent: Jan. 5, 2016

(54) OXYGEN REGULATOR TO DELIVER BREATHING GAS IN AN AIRCRAFT

(75) Inventors: Matthieu Fromage, Saint-Arnoult-en-Yvelines (FR); Wolfgang Rittner, Siblin (DE); Gunter Boomgarden, Scharbeutz (DE); Christophe Besset, Plaisir (FR)

(73) Assignee: Zodiac Aerotechnics, Plaisir (FR)

( * ) Notice: Subject to any disclaimer, the term of this patent is extended or adjusted under 35 U.S.C. 154(b) by 326 days.

(21) Appl. No.: 13/823,173

(22) PCT Filed: Sep. 23, 2010

(86) PCT No.: PCT/IB2010/002629
§ 371 (c)(1),
(2), (4) Date: Mar. 14, 2013

(87) PCT Pub. No.: WO2012/038774
PCT Pub. Date: Mar. 29, 2012

(65) Prior Publication Data
US 2013/0174848 A1 Jul. 11, 2013

(51) Int. Cl.
*A62B 7/00* (2006.01)
*A62B 18/02* (2006.01)
*F24F 7/00* (2006.01)
*A62B 7/14* (2006.01)
(Continued)

(52) U.S. Cl.
CPC ... *A62B 7/00* (2013.01); *A62B 7/14* (2013.01); *A62B 9/02* (2013.01); *A62B 18/02* (2013.01); *B64D 10/00* (2013.01); *F24F 7/00* (2013.01); *B64D 2231/00* (2013.01)

(58) Field of Classification Search
CPC ............ A62B 7/14; A62B 9/02; A62B 18/02; B64D 10/00; B64D 2231/00; B64D 2231/02; B64D 2231/025
USPC ............. 128/200.24, 204.18, 204.21, 204.26, 128/204.29, 205.11, 205.24, 205.25; 244/118.5
See application file for complete search history.

(56) References Cited

U.S. PATENT DOCUMENTS 2,248,349 A * 7/1941 Heidbrink ................ A62B 7/14
128/205.17
2,396,116 A * 3/1946 Noxon .................... B64D 13/04
454/73
(Continued)

FOREIGN PATENT DOCUMENTS

FR 2517209 A1 6/1983
WO 2007121773 A1 11/2007

OTHER PUBLICATIONS

International Search Report and Written Opinion dated Feb. 13, 2013 in Application No. PCT/IB2010/002629.

*Primary Examiner* — Tan-Uyen (Jackie) T Ho
*Assistant Examiner* — Joseph D Boecker
(74) *Attorney, Agent, or Firm* — Kilpatrick Townsend & Stockton LLP; Dean W. Russell; Kristin M. Crall (57) ABSTRACT

Oxygen regulator (1) to deliver breathing gas in a cabin (10) of an aircraft comprising a first inlet (12) for pressurized breathing oxygen, a second inlet (14) for diluter gas, an outlet (16) to provide a breathing mixture to a user, and a regulation device adjusting the concentration of breathing oxygen in the breathing mixture. The regulation device comprises a emergency device (30) that adjusts the concentration of breathing oxygen in the breathing mixture as a function of a variation speed of the cabin altitude.

21 Claims, 9 Drawing Sheets

(51) Int. Cl.
*A62B 9/02* (2006.01)
*B64D 10/00* (2006.01)

(56) References Cited

U.S. PATENT DOCUMENTS

| | | | | |
|---|---|---|---|---|
| 3,077,881 A * | 2/1963 | Sprague | ................ | A62B 9/022 128/204.28 |
| 3,768,466 A * | 10/1973 | Johnson | ................ | A62B 9/02 128/204.26 |
| 3,875,957 A * | 4/1975 | Veit | ................ | A61M 16/12 128/205.11 |
| 4,230,097 A * | 10/1980 | Beaussant | ................ | B64D 10/00 128/204.26 |
| 4,335,735 A * | 6/1982 | Cramer | ................ | A62B 9/022 128/204.26 |
| 4,648,397 A * | 3/1987 | Beale | ................ | A62B 7/14 128/204.26 |
| 4,919,124 A * | 4/1990 | Stevenson | ................ | A62B 7/14 128/202.26 |
| 5,357,949 A * | 10/1994 | Bertheau | ................ | A62B 7/14 128/24.18 |
| 5,431,533 A * | 7/1995 | Hobbs | ................ | F01D 5/145 415/145 |
| 5,645,055 A * | 7/1997 | Danon | ................ | A62B 7/14 128/204.18 |
| 6,789,539 B2 * | 9/2004 | Martinez | ................ | A62B 7/14 128/204.21 |
| 6,796,306 B2 | 9/2004 | Martinez | | |
| 6,994,086 B1 | 2/2006 | Martinez et al. | | |
| 7,584,753 B2 * | 9/2009 | Aubonnet | ................ | A61M 16/0677 128/204.18 |
| 8,261,743 B2 * | 9/2012 | Bachelard | ................ | A62B 7/14 128/204.26 |
| 8,312,880 B2 * | 11/2012 | Hk | ................ | A62B 7/14 128/205.11 |
| 9,022,033 B2 * | 5/2015 | Hk | ................ | A61M 16/0051 128/200.24 |
| 2009/0165796 A1 | 7/2009 | Aubonnet et al. | | |
| 2011/0011403 A1 * | 1/2011 | Hannah | ................ | A62B 7/14 128/204.29 |
| 2012/0325207 A1 * | 12/2012 | Fromage | ................ | A62B 7/14 128/203.14 |

* cited by examiner

OXYGEN REGULATOR TO DELIVER BREATHING GAS IN AN AIRCRAFT

CROSS REFERENCE TO RELATED APPLICATION

This application is the U.S. national phase of International Application No. PCT/IB2010/002629 filed on Sep. 23, 2010, the entire contents of which are incorporated herein by reference.

FIELD OF THE INVENTION

The invention relates to an oxygen regulator to deliver breathing gas in a cabin of an aircraft. Such oxygen regulators are used by the crew members of civil or military aircraft.

BACKGROUND OF THE INVENTION

Such aircrafts are equipped with a pressurized cabin. The pressure value of the cabin is often referred to as the cabin altitude. Cabin altitude is defined as the altitude corresponding to the pressurized atmosphere maintained within the cabin. This value differs from the aircraft altitude which is its actual physical altitude. Correspondence between pressure and conventional altitude are defined in tables.

The aircrafts are further equipped with a breathing system to deliver a breathable gas to all passengers and crew members in emergency situations such as a cabin pressurization accident or smoke in the cockpit. The breathing system includes pressurized oxygen cylinders, chemical generators, or On-Board Oxygen Generator System (OBOGS) or more generally any sources of oxygen.

The breathing system further comprises breathing masks and a regulator. Usual oxygen regulators include at least a dilution mode, in which the equipment delivers a breathing mixture of breathing oxygen and diluter gas (air), the concentration of the breathing oxygen depending on the cabin altitude.

Furthermore, the regulator may be able to supply the required respiratory gas volume according to the wearer's demand.

In the event of a depressurization, the cabin altitude increases and tends to converge towards the aircraft altitude. In the same time, the pilot reduces the aircraft altitude in order to minimise the time during which the cabin altitude is too high to enable passengers who have not correctly donned a breathing mask to survive without after-effects.

Then, the pilot may slightly increase the aircraft altitude to a diversion altitude in order to improve the operating conditions of the engine and to reach a diversion airport.

The minimum concentration of oxygen in the breathing mixture is set for civil aviation by the Federal Aviation Regulations (FAR). The minimum oxygen concentration for crew demand equipments as requested by the FAR is shown in particular in document WO2007/121773.

Most of the current crew breathing masks are equipped with oxygen regulators using pneumatic technology to satisfy to this requirement. In this technology, ambient air is sucked by a Venturi made through high velocity oxygen flow. An aneroid capsule (called also altimeter capsule) regulates the altimetric oxygen enrichment by adjusting the section of the ambient air inlet.

SUMMARY OF THE INVENTION

The purpose of this invention is to improve the level of protection of the crew (in particular the pilot) without degrading oxygen consumption when the pilot is wearing his mask in the dilution mode.

For this purpose the invention provides an oxygen regulator comprising:
 a first inlet for pressurized breathing oxygen,
 a second inlet for diluter gas,
 an outlet to provide a breathing mixture to a user,
 a regulation device adjusting the concentration of breathing oxygen in the breathing mixture,
 wherein the regulation device comprises an emergency device that adjusts the concentration of breathing oxygen in the breathing mixture as a function of a variation speed of the cabin altitude.

Therefore, in case of depressurization, the oxygen concentration may be early increased well above the minimum requirements of oxygen concentration while consuming only the required concentration of oxygen when the cabin altitude is not highly increasing, in particular in diversion conditions It appears that, in case of depressurization, early switch to high oxygen concentration enrichment is advantageous to increase the minimum of the partial pressure in oxygen in blood in particular in case of slightly slower depressurization (10 s to 45 s decompression duration).

Moreover, the enrichment in oxygen of the breathing mixture in case of depressurization is automatic. Therefore, it does not require any time to the pilot who has to cope with an emergency situation. Moreover, in case of depressurization, the concentration in oxygen of the breathing mixture is increased even if the user looses consciousness.

According to another feature in accordance with the invention, the emergency device preferably closes the second inlet to provide only breathing oxygen at the outlet above an enrichment threshold of the variation speed of the cabin altitude.

Therefore, the concentration in oxygen in the lungs and in the blood is optimised.

According to a supplementary feature in accordance with the invention, the enrichment threshold is preferably higher than 100 m/s.

This threshold enables to increase the partial pressure in oxygen in blood in most occurrences of depressurization and avoid excessive consumption of oxygen due to inappropriate enrichment in oxygen of the breathing mixture.

According to another feature in accordance with the invention, the emergency device preferably opens the second inlet to provide diluter gas at the outlet below a dilution threshold of the variation speed of the cabin altitude.

Therefore, the concentration in oxygen in the breathing mixture is reduced when the circumstances do not require a high concentration in oxygen anymore. So, the consumption of oxygen is reduced.

According to a supplementary feature in accordance with the invention, the dilution threshold is preferably equal to the enrichment threshold.

According to another feature in accordance with the invention, the emergency device is preferably pneumatic.

Therefore, the emergency device does not require electrical power and is therefore safer.

According to another feature in accordance with the invention, the emergency device is preferably of on/off type.

The effect of the increase of the oxygen concentration is thus stronger.

According to another feature in accordance with the invention, the regulation device preferably further adjusts the concentration of breathing oxygen as a function of the cabin altitude.

Therefore, the regulator optimises the concentration in oxygen in the breathing mixture before depressurization, during depressurization and after depressurization (in diversion conditions).

According to a supplementary feature in accordance with the invention, the regulation device preferably further comprises a dilution device distinct from the emergency device which adjusts the concentration in breathing oxygen as a function of the cabin altitude.

This solution is simpler to settle in order to optimise the consumption in oxygen and is therefore more efficient.

In advantageous embodiments, the breathing assembly preferably further has one or more of the following features:
the emergency device comprises a chamber of variable volume and a restricted communication device between the variable volume chamber and the ambient air of the cabin;
the restricted communication device comprises a hole having a section of passage of gas lower than 0.05 square millimeter;
the restricted communication device comprises a mobile element to adjust the section of passage of gas through the hole;
the restricted communication device comprises a porous material;
the emergency device comprises a piston having a movable part separating said variable volume chamber from the air of the cabin;
the oxygen regulator comprises a body, the emergency device comprises a flexible housing delimiting the variable volume chamber, the flexible housing has a movable part, and the flexible housing extends between the movable part and the body of the regulator;
the flexible housing comprises bellows or fold.

According to a supplementary feature in accordance with the invention, preferably the emergency device comprises an inflatable balloon defining an internal chamber, the variable volume chamber comprises the internal chamber of the balloon, in inflated state the balloon closes the second inlet and in deflated state the balloon enables communication through the second inlet.

According to a supplementary feature in accordance with the invention, the oxygen regulator preferably has the following characteristics:
the emergency device further comprises a closing element having a closing position in which it closes the second inlet and an opening position in which it allows communication through the second inlet,
the closing element is mechanically connected to said movable part, so that the movable part moves the closing element from the opening position to the closing position as function of the cabin altitude decreasing speed.

This solution is simple and therefore not expensive.

According to an alternative feature in accordance with the invention, the oxygen regulator preferably has the following characteristics:
the regulator comprises a closing element and an amplification device including a high pressure hole, a gasket and a feeding duct,
the gasket is movable between an opening position in which it enables communication between the first inlet and the feeding duct and a closing position in which it prevents communication between the first inlet (12) and the feeding duct,
the variation of the volume of the variable volume chamber moves the gasket between the closing position and the opening position, and
the closing element has an opening state in which it does not close the second inlet when the feeding duct is not pressurized and a closing state in which it closes the second inlet when the feeding duct is pressurized.

Thus, the energy of the pressurized breathing oxygen is used to amplify the effect of the depressurisation in order to close the second inlet.

According to a supplementary feature in accordance with the invention, the closing element preferably comprises an inflatable balloon.

In accordance with the invention, the closing device preferably comprises an elastomer seal, a guillotine device (sliding gate), rotary shutter or inflatable balloon.

The invention further relates to a breathing mask comprising the oxygen regulator.

BRIEF DESCRIPTION OF THE DRAWINGS

Other features and advantages of the present invention will appear in the following detailed description, with reference to the appended drawings in which.

DETAILED DESCRIPTION OF AN EMBODIMENT OF THE INVENTION

Figure 1:
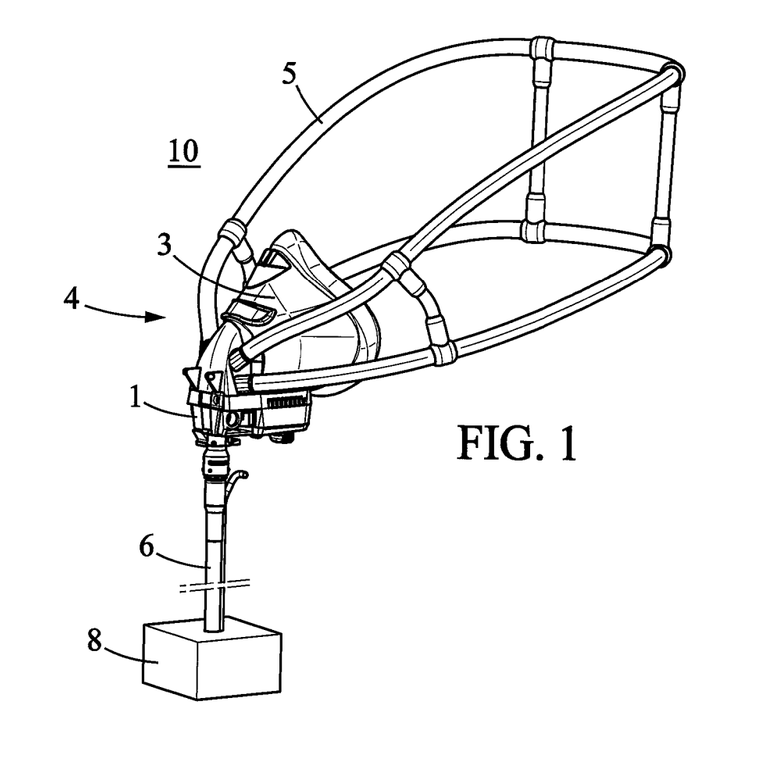
FIG. 1 represents in perspective a breathing assembly comprising a breathing mask having an oxygen regulator.

FIG. 1 illustrates a breathing assembly disposed in a cabin 10 of an aircraft and comprising in particular a breathing mask 4 in fluid communication with a source of pressurized breathing oxygen 8 through a feeding duct 6.

The breathing mask 4 comprises a regulator 1, an oronasal face piece 3 and a harness 7. The harness 7 is elastic to clamp the oronasal face piece 3 on the user's face. Each of the regulator 1 and the harness 7 are connected to the oronasal face piece 3. The oronasal face piece 3 has a flexible portion to be sealingly applied over the bottom of a user's face.

The regulator 1 is pneumatic and is intended to regulate the concentration in oxygen of a breathing mixture provided to the user through the oronasal face piece 3. The regulator 1 is moreover of on-demand type, so that the breathing mixture is provided only when the user breaths.

As shown in FIGS. 2A to 8C, the regulator 1 comprises a rigid body 2 having a connection portion 5 to which the oronasal face piece 3 is intended to be sealingly connected. The body 2 comprises an inhalation circuit and an exhalation circuit.

The inhalation circuit comprises an oxygen inlet 12, an air inlet 14 and an outlet 16. The oxygen inlet 12 is connected to the feeding duct 6. So, the oxygen inlet 12 in intended to feed the inhalation outlet 16 with pressurized breathing oxygen. The air inlet 14 is intended to feed the inhalation outlet 16 with diluter gas, which is ambient air in the present case. So, diluter gas is intended to flow through the air inlet 14. The inhalation outlet 16 is in communication with the oronasal face piece 3 and supplies the oronasal face piece 3 with breathing mixture comprising breathing oxygen and diluter gas.

The exhalation circuit comprises an exhalation valve 50, an exhalation inlet 52 and an exhalation outlet 54. The exhalation inlet 52 is in communication with the oronasal face piece 3 and receives gas exhaled by the user.

The exhalation outlet 54 is in communication with the ambient air of the cabin 10. The exhalation valve 50 is a flexible airtight membrane which separates an exhaust chamber 58 disposed on one side of the membrane from the exhalation inlet 52 and the exhalation outlet 54 both disposed on the other side of the membrane 50. When the pressure in the exhalation inlet 52 is close to the pressure in the exhaust chamber 58, the exhalation valve 50 rests on a first seat 56 in order to separate the exhalation inlet 52 from the exhalation outlet 54. In the present case, the exhaust chamber 58 is in communication with the ambient air of the cabin 10 through an exhaust conduit 59. In a variant, a valve may be disposed in the exhaust conduit 59.

The regulator 1 further comprises a first conduit 64, a second conduit 66 and an inhalation valve 60 cooperating with a fixed seat 62. The inhalation valve 60 is formed by a membrane movable between a closing position and an opening position. In the closing position, the inhalation valve 60 rests on the fixed seat 62 and interrupts communication between the oxygen inlet 12 and the inhalation outlet 16. In the opening position the inhalation valve 60 is away from the seat 62 and the outlet 16 is in communication with the oxygen inlet 12.

Whatever the position of the inhalation valve 60 is, the membrane of the inhalation valve 60 separates a control chamber 68 disposed on one side of the membrane from the oxygen inlet 12 and the outlet 16, both disposed on the other side of the membrane. The control chamber 68 communicates with the inlet 12 through the first conduit 64 which comprises a calibrated constriction 65.

The regulator 1 further comprises an obturator 70 carried by the membrane of the exhalation valve 50. The obturator 70 cooperates with a second seat 72. The obturator 70 is biased toward the second seat 72 by a spring 74. When the pressure in the exhalation inlet 52 is equal to the pressure in the exhaust chamber 58, due to the biasing pressure of the spring 74, the obturator 70 rests on the second seat 72 and closes the second conduit 66, since the second conduit 66 ends in the second seat 72. Thus, the control chamber 68 is isolated from the exhaust chamber 58. When the pressure in the exhalation inlet 52 is lower than the pressure in the exhaust chamber 58 and the pressure difference is sufficient to compress the spring 74, the obturator 70 is moved away from the second seat 72 against the biasing pressure of the spring 74. Therefore, the control chamber 68 communicates with the exhaust chamber 58 through the second conduit 66.

Without inhalation of the user in the oronasal face piece 3, the control chamber 68 is subjected to the pressure of the breathing oxygen in the oxygen inlet 12. So, the inhalation valve 60 is pressed against the seat 62, closes the passage between the inhalation valve 60 and the seat 62, and separates the oxygen inlet 12 from the inhalation outlet 16.

When the user inhales, the pressure in the exhalation inlet 52 is lowered and thus the obturator 70 is moved away from the second seat 72. So, the control chamber 68 is subjected to the pressure of exhaust chamber 58, and the passage between the inhalation valve 60 and the seat 62 is opened. Therefore, the inhalation outlet 16 is fed with breathing mixture comprising breathing oxygen from the oxygen inlet 12 and dilution gas from the air inlet 14.

When the user exhales, the pressure in the exhalation inlet 52 is increased and thus the exhalation valve 50 is moved away from the first seat 62. Therefore, the exhalation gas are exhausted by the exhalation outlet 54.

Figure 8A:
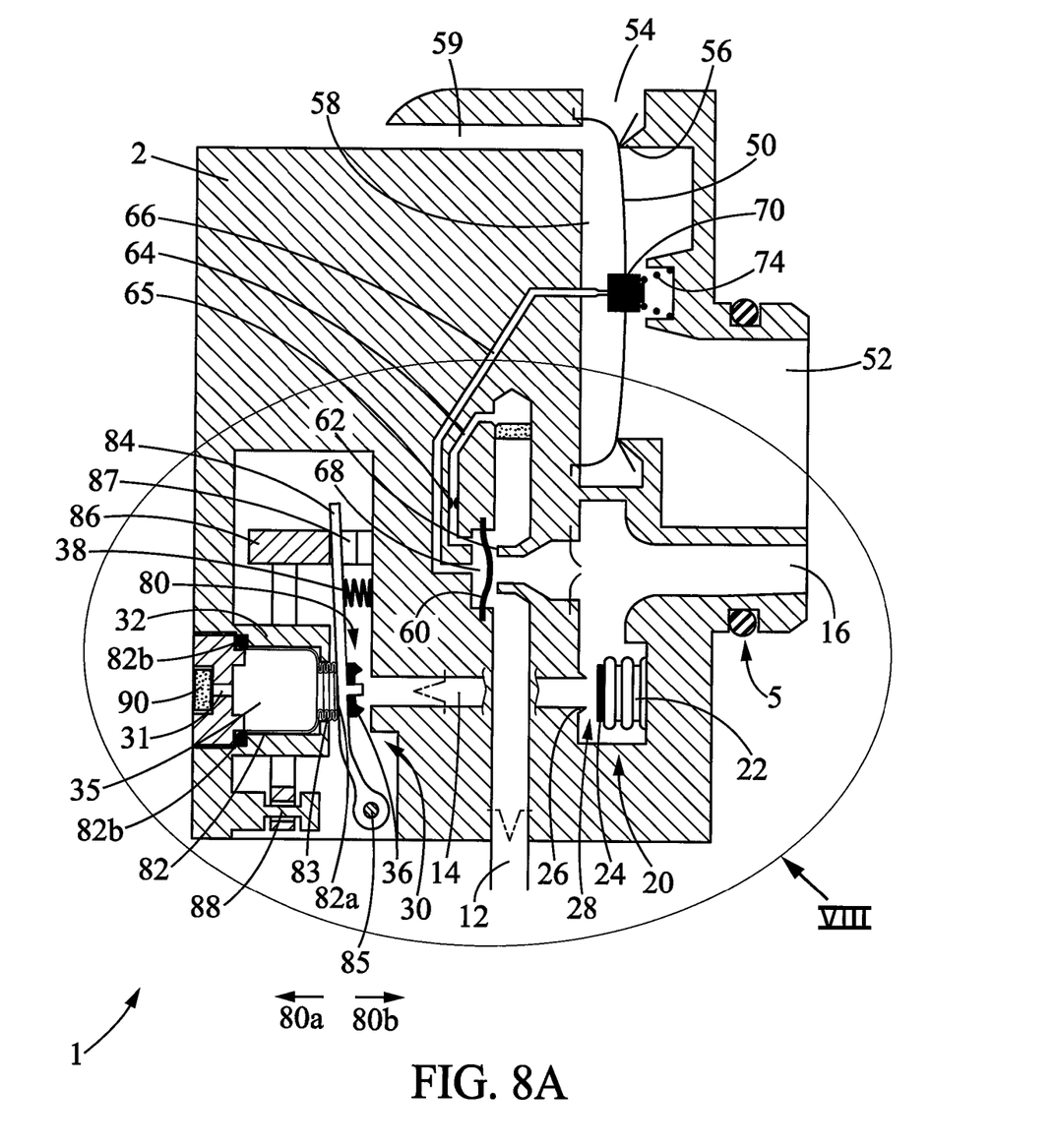
FIG. 8A represents a sixth embodiment of oxygen regulator according to the invention, in a first state.
Figure 8B:
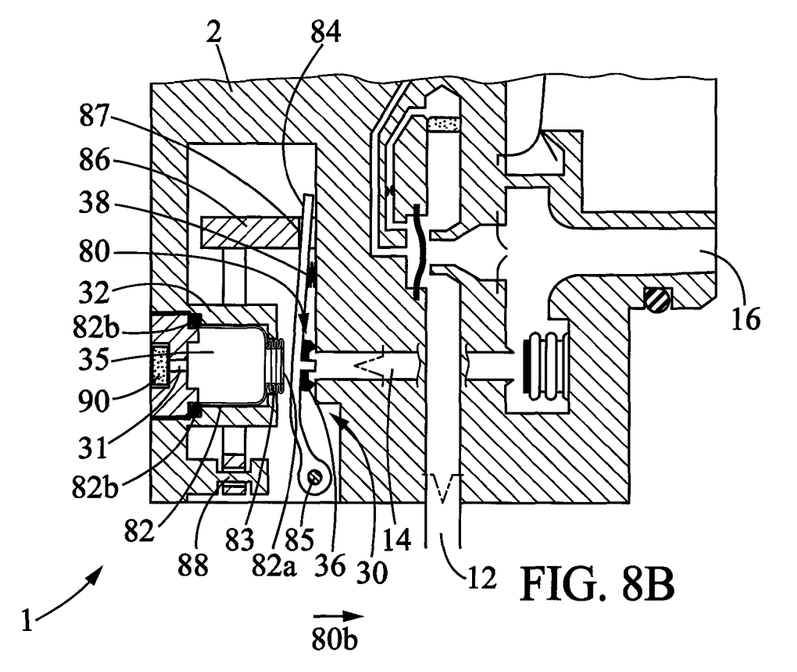
FIG. 8B represents the area referenced VIII in FIG. 8A of the sixth embodiment of oxygen regulator, in a second state.
Figure 8C:
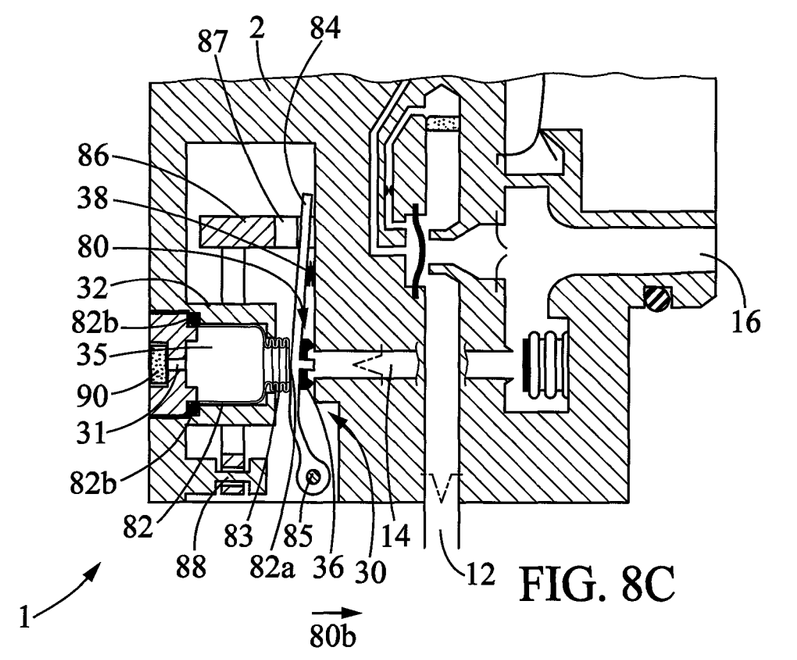
FIG. 8C represents the area referenced VIII in FIG. 8A of the sixth embodiment of oxygen regulator, in a third state.

The regulator 1 has a regulation mode, a pure oxygen mode and a fire mode which can be selectively activated by the user thanks to a lever 86 (shown in FIGS. 8A to 8C). In the pure oxygen mode, the inhalation outlet 16 is fed only by the oxygen inlet 12 and the flow in the air inlet 14 is interrupted. Therefore, the inhalation outlet 16 is fed only with pressurized breathing oxygen from the source of pressurized breathing oxygen 8. In the fire mode, as in the pure oxygen mode, the inhalation outlet 16 is fed only with pressurized breathing oxygen from the source of pressurized breathing oxygen 8, but the pressure in the inhalation outlet 16 is upper than the ambient pressure in the cabin 10. In the regulation mode, also called dilution mode, the regulator 1 automatically regulates the concentration of pressurized breathing oxygen from the source of pressurized breathing oxygen 8 in the range of 0% to 100%.

The regulator 1 comprises a regulation device 20, 30 which controls, in the regulation mode, the flow in the oxygen inlet 12 and the air inlet 14 in order to regulate the concentration in oxygen in the breathing mixture in the outlet 16. The regulation device comprises a dilution device 20 and an emergency device 30.

The dilution device 20 comprises an aneroid capsule 22, a gasket 24 and a dilution seat 26. When the cabin altitude increases, the ambient pressure decreases. So, the aneroid capsule 22 moves the gasket 24 towards the dilution seat 26. Therefore, passage 28 between the gasket 24 and the dilution seat 26 shrinks when the cabin altitude increases. Thus, the concentration of oxygen in the exhalation outlet 16 is automatically regulated as function as the cabin altitude.

The regulator 1 as described above is well known and can be modified without departing from the invention.

The emergency device 30 will now be describes in connection with several embodiments in accordance with the invention.

Figure 2A:
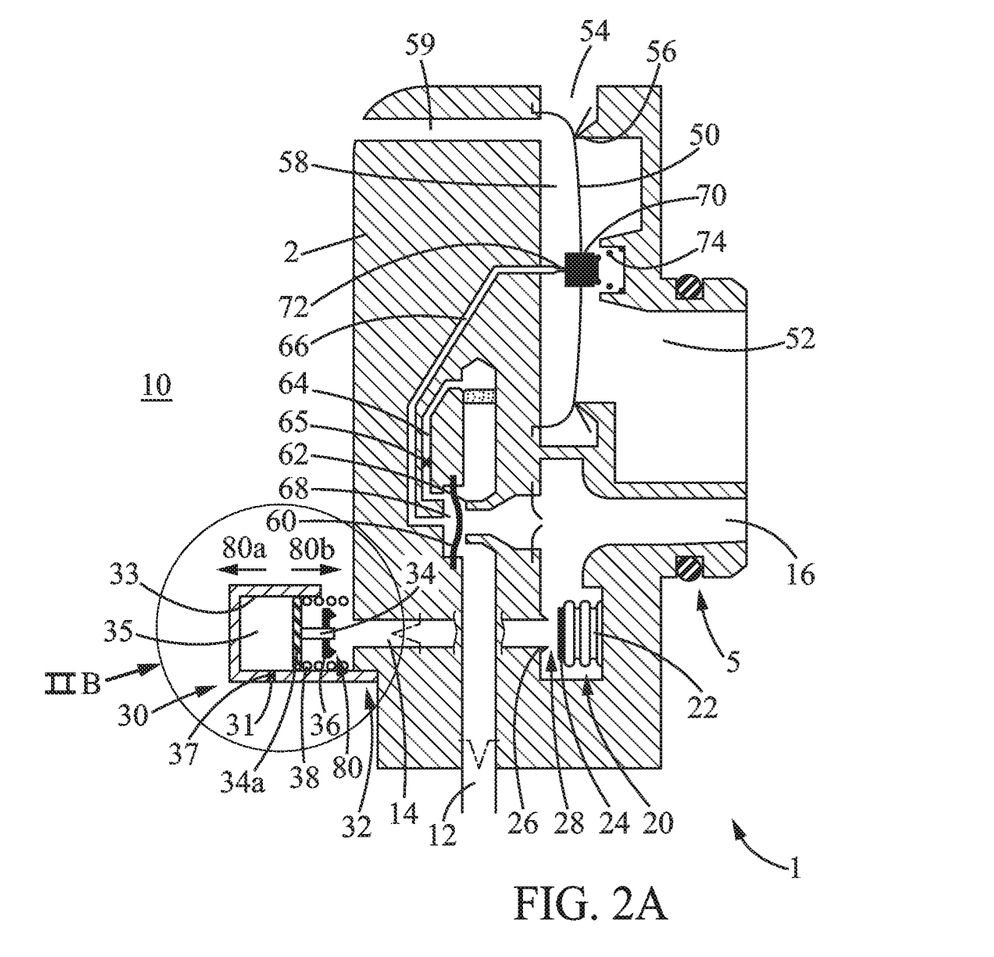
FIG. 2A represents a first embodiment of oxygen regulator according to the invention, in a first state.
Figure 2B:
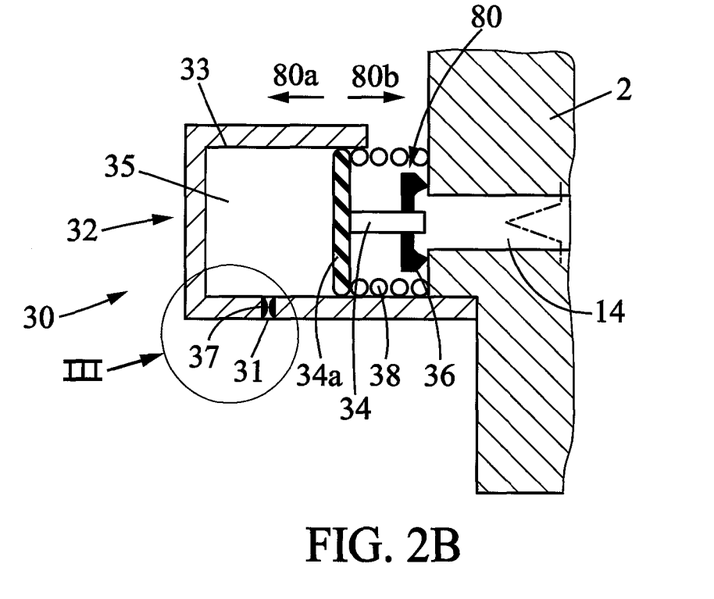
FIG. 2B represents, at increased scale, the area referenced II in FIG. 2A of the first embodiment of oxygen regulator, in a second state.

In the first embodiment shown in FIGS. 2A and 2B, the emergency device 30 comprises an air inlet closing element 80 and a rigid housing 32 defining a cylinder 33 within which a piston 34 is received. The housing 32 and the piston 34 delimit a variable volume chamber 35 communicating with the ambient air of the cabin 10 through a hole 31. The piston 34 has a movable plate 34a separating said variable volume chamber 35 from the air of the cabin 10. The hole has a calibrated constriction 37, so that it defines a calibrated orifice.

The air inlet closing element 80 comprises a gasket secured to the piston 34. The piston 34 is movable between an opening position (shown in FIG. 2A) and a closing position (shown in FIG. 2B). In the closing position, the air inlet closing element 80 closes the air inlet 14, so that communication between the air inlet 14 and the ambient air 10 is prevented. In the opening position, the air inlet closing element 80 is away from the air inlet 14, so that the air inlet 14 is in free communication with ambient air of the cabin 10.

The emergency device 30 further comprises a return spring 38 biasing the piston 34 in a first direction 80a, towards the opening position. So, without variation of the cabin altitude (i.e. the cabin pressure) the air inlet closing element 80 is in the opening position.

The section of the calibrated orifice 31 is sufficiently large so that during normal conditions of flight, the speed of variation of the cabin altitude does not induce a substantial moving of the air inlet closing element 80 relative to the opening position. So, as shown in FIG. 2A, during normal conditions of flight, the concentration in oxygen of the breathing mixture provided to the user through the inhalation outlet 16 is regulated by the dilution device 20 and the emergency device 30 has no substantial effect on said concentration.

But, the section of the calibrated orifice 31 is sufficiently narrow so that in case of depressurisation (quick decrease of the air pressure in the cabin 10), i.e. in case of quick increase of the cabin altitude, the piston 34 moves the air inlet closing element 80 in a second direction 80b, in order to increase the concentration of oxygen in the breathing mixture provided to the user. The second direction 80b is opposed to the first direction 80a. When the increase speed of the cabin altitude is higher than an enrichment threshold, as shown in FIG. 2B, the piston 34 places the air inlet closing element 80 in the closing position. Thus, the air inlet 14 is closed and the inhalation outlet 16 is fed only with breathing oxygen from the source 8.

When the increase of the cabin altitude becomes lower than the enrichment threshold, the air inlet closing element 80 is moved in the first direction 80a away from the closing posing position, due to the spring 38. Therefore, when the cabin altitude is again subjected to low variations (after depressurisation), the emergency device 30 has again no effect on the concentration of oxygen in the breathing mixture provided to the user which is thus regulated only by the dilution device 20 (as in the normal conditions before depressurization).

Preferably, the enrichment threshold is between 100 m/s and 600 m/s. Moreover, the section of the calibrated constriction 37 is preferably lower than 0.05 square millimeter, advantageously close to 0.01 square millimeter.

Figure 3:
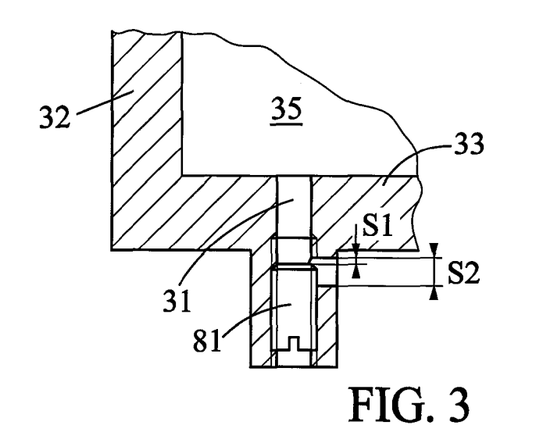
FIG. 3 represents, at increased scale, an alternative embodiment of the oxygen regulator in the area referenced III in FIG. 2B.

The variant embodiment illustrated in FIG. 3 differs from the embodiment shown in FIGS. 2A and 2B in that the hole 31 is threaded and a set screw 81 is substituted for the calibrated constriction 37. So, the section S1 for the passage of air is adjustable between 0 and the section S2 of the hole 31 upon screwing/unscrewing of the set screw 81 in the hole 31.

Figure 4A:
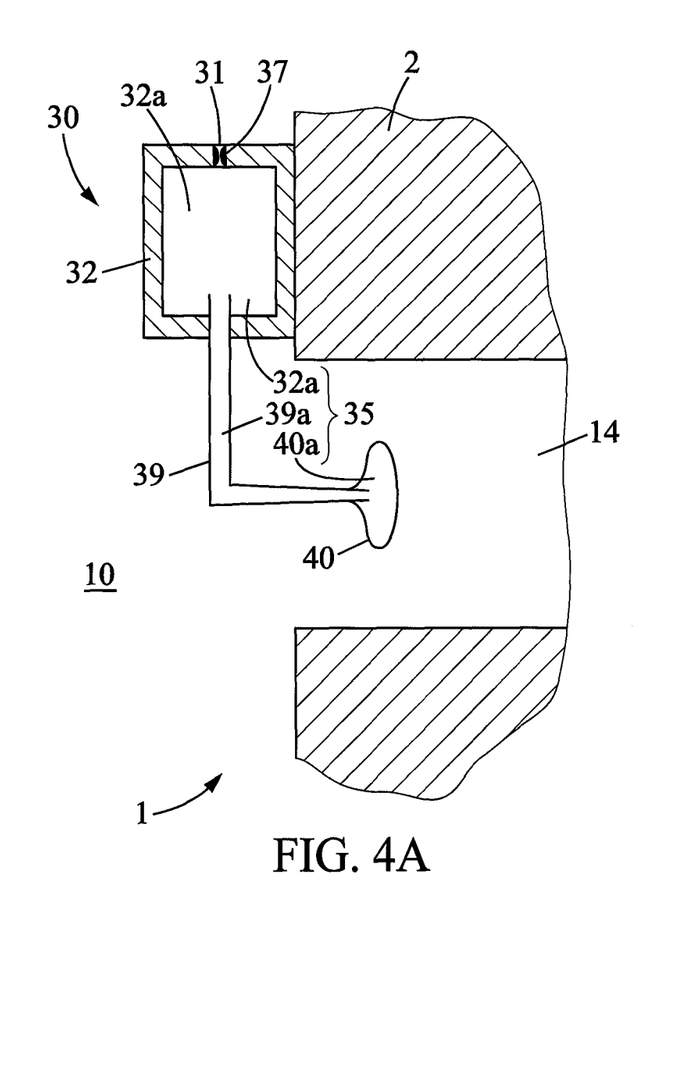
FIG. 4A represents a second embodiment of oxygen regulator according to the invention, in the area referenced II in FIG. 2A, in a first state.
Figure 4B:
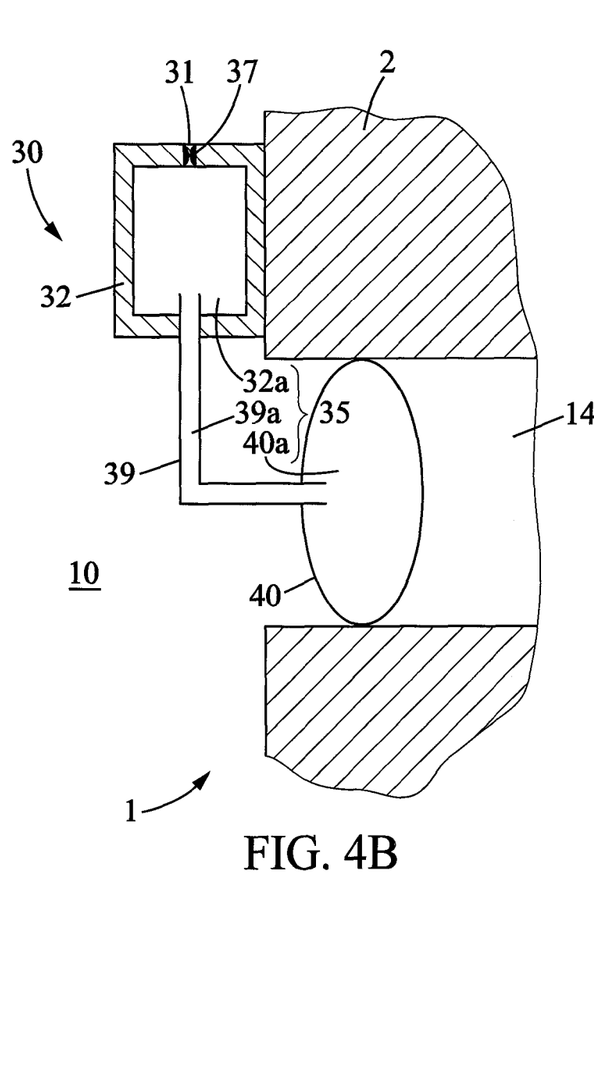
FIG. 4B represents the second embodiment of oxygen regulator according to the invention, in the area referenced II in FIG. 2A, in a second state.

In the second embodiment shown in FIGS. 4A and 4B, the emergency device 30 comprises a rigid housing 32 having an internal volume 32a, an inflatable balloon 40 having an internal volume 40a and a feeding duct 39 having an internal volume 39a and extending between the rigid housing 32 and the balloon 40. The internal volume 32a of the housing 32, the internal volume 39a of the feeding duct 39 and the internal volume 40a of the balloon 40 defines a variable volume chamber 35. The section of the feeding duct is sufficient to avoid any substantial difference of pressure between the internal volume 32a of the housing 32 and the internal volume 40a of the balloon 40. The balloon 40 is placed in the air inlet 14 and constitutes the air inlet closing element 80.

In the embodiment shown in FIGS. 4A and 4B, as in the first embodiment shown in FIGS. 2A and 2B, the variable volume chamber 35 communicates with ambient air of the cabin 10 through a hole 31 having a calibrated constriction 37.

In normal conditions of flight, the pressure in the variable volume chamber 35 and the pressure in the cabin pressure are substantially equal. Consequently, the balloon 40 is in deflated state, the concentration of oxygen in the breathing mixture provided to the user through the inhalation outlet 16 is regulated by the dilution device 20 and the emergency device 30 has no effect on said concentration.

During depressurization, because of the cabin pressure drop, the absolute pressure in the cabin 10 is lower than the absolute pressure in the variable volume chamber 35. So, the balloon 40 inflates until closing the air inlet 14 when the increase speed of the cabin altitude is higher than an enrichment threshold. Thus, the regulator 1 supplies the pilot with high enrichment oxygen mixture provided by the source 8.

After depressurization, as the variable volume chamber 35 wastes pressure through the hole 31 with calibrated restriction 37, the balloon 40 deflates and the breathing mixture provided to the user is again regulated by the dilution device 20 (as in the normal conditions before depressurization).

Figure 5A:
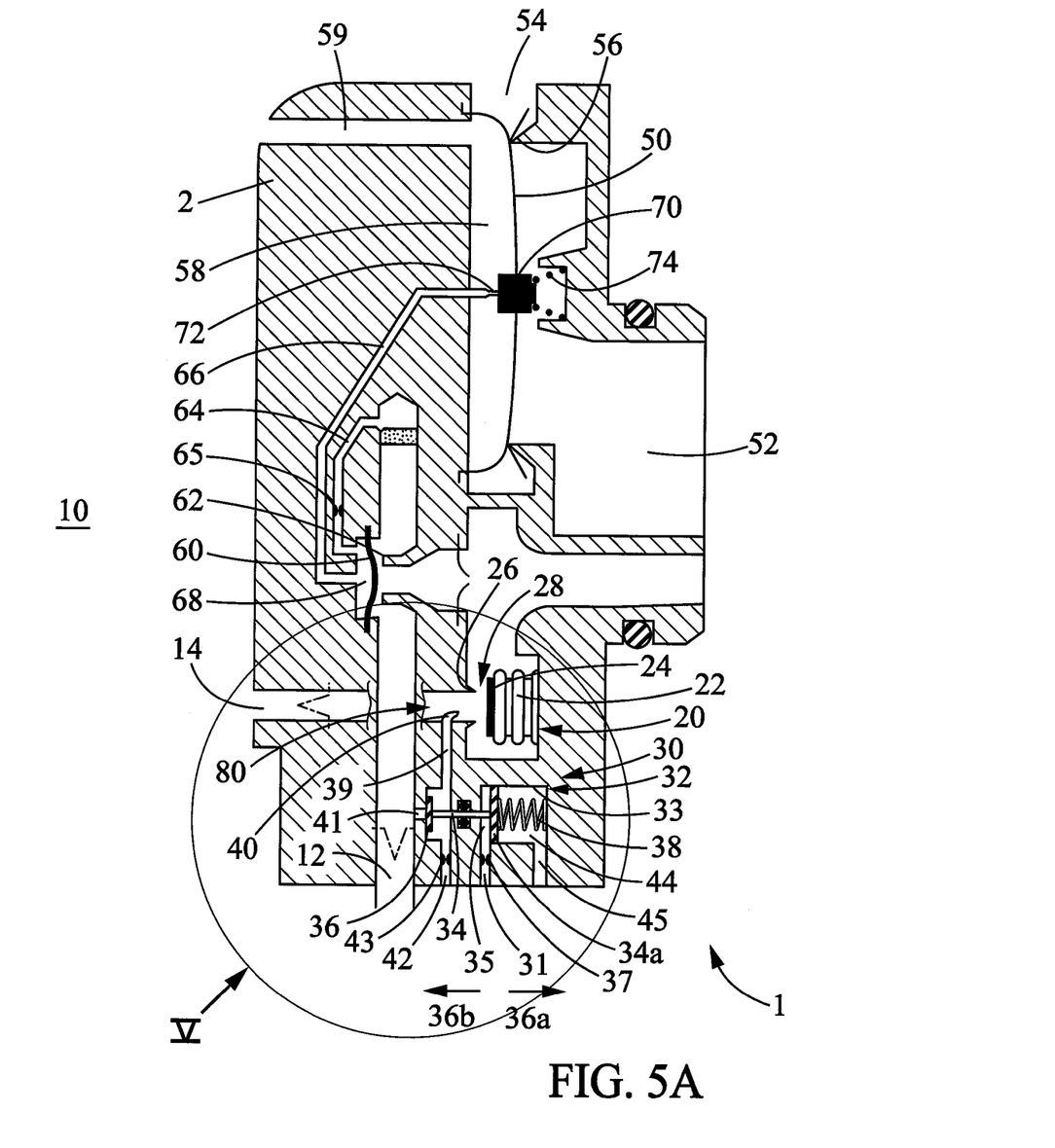
FIG. 5A represents a third embodiment of oxygen regulator according to the invention, in a first state.
Figure 5B:
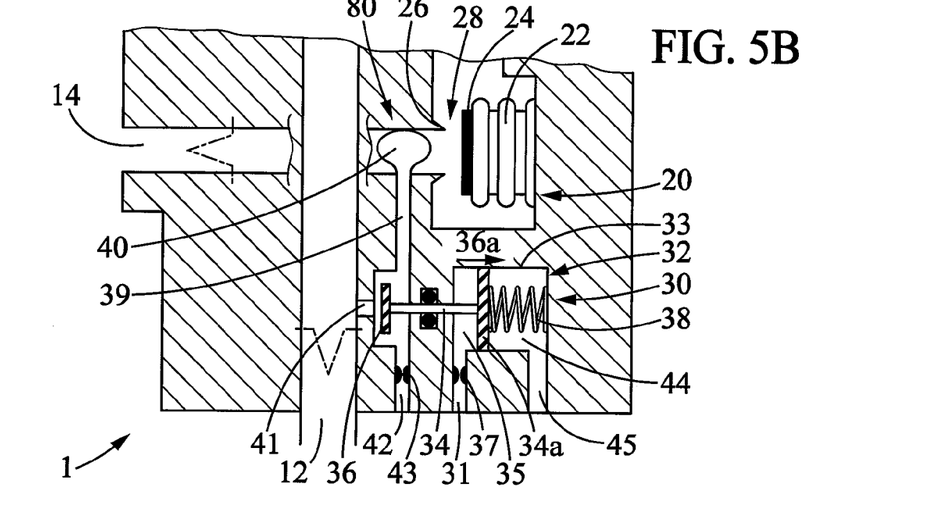
FIG. 5B represents, at increased scale, the area referenced V in FIG. 5A of the third embodiment of oxygen regulator, in a second state.

In the third embodiment shown in FIGS. 5A and 5B, the emergency device 30 comprises, as in the second embodiment, a rigid housing 32 defining a variable volume chamber 35, an inflatable balloon 40 forming air inlet closing element 80 and a feeding duct 39. But, the emergency device 30 further comprises an amplifying device, so that the emergency device 30 is of on/off type and the balloon 40 is fed with pressurized gas (pressurized breathing oxygen), when the increase speed of the cabin altitude is higher than an enrichment threshold.

The amplifying device comprises a piston 34 having a movable plate 34a, a gasket 36 connected to the piston 34, a return spring 38 and a high pressure hole 41.

The rigid housing 32 defines a cylinder 33 within which the movable plate 34a of the piston 34 is received. The movable plate 34a of the piston 34 separates said variable volume chamber 35 from a chamber 44 maintained at the pressure of the cabin 10 by a duct 45 which extends between the chamber 44 and ambient air of the cabin 10. The gasket 36 is disposed between the high pressure hole 41 and the feeding duct 39. Furthermore, the feeding duct 39 communicates with the ambient air of the cabin 10 through an exhaust duct 42 having a calibrated restriction 43.

As shown in FIG. 5A, during normal conditions of flight, the variation of the cabin altitude does not induce a pressure on the movable plate 34a higher than the pressure of the return spring 38 in a first gasket direction 36a. Therefore, the gasket 36 closes the high pressure hole 41. So, the feeding duct 39 is not fed with pressurized gas from the source 8, but contains gas at the ambient pressure of the cabin 10. Therefore, the balloon 40 in the air inlet 14 is deflated.

As shown in FIG. 5B, during depressurization, the increase speed of the cabin altitude being higher than an enrichment threshold, the difference between the pressure in the variable volume chamber 35 and the pressure in the cabin 10 (and therefore in the chamber 44) is sufficient to induce on the movable plate 34a of the piston 34 a strength higher than the pressure of the return spring 38. Therefore, the movable plate 34a and the gasket 36 are moved in a second gasket direction 36b opposed to the first gasket direction 36a. So, the gasket 36 does not close the high pressure hole 41 anymore, the feeding duct 39 communicates with the oxygen inlet 12 and the pressurized oxygen inflates the balloon 40 up to close the air inlet 14. Thus, the oxygen regulator 1 supplies the pilot with high enrichment oxygen mixture provided by the source 8.

After depressurization, as the differential pressure between variable volume chamber 35 and the cabin 10 is decreasing, the return spring urges the piston 34 in a first gasket direction 36a and the gasket 36 is closing the high pressure hole 41 when the increase speed of the cabin altitude becomes lower than a dilution threshold which is lower than the enrichment threshold. Thus, pressurized breathing oxygen contained in the balloon 40 flowing through the exhaust duct 42. So, the oxygen inlet 12 is opened again, the balloon 40 deflates and the breathing mixture provided to the user is again regulated by the dilution device 20 (as in the normal conditions before depressurization).

Figure 6A:
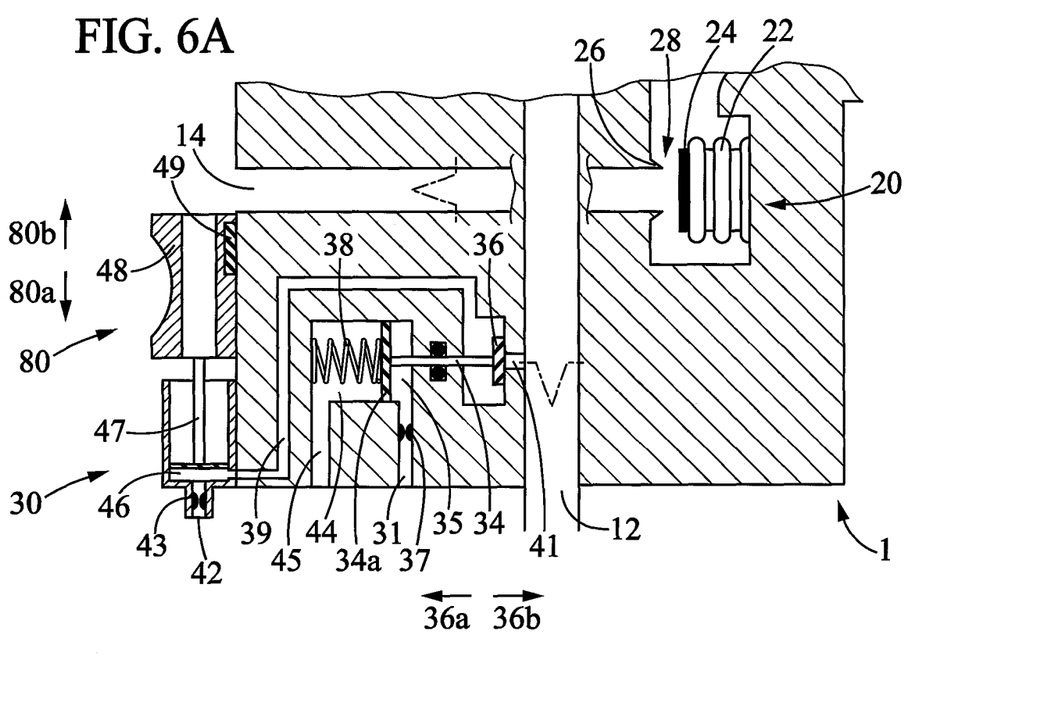
FIG. 6A represents a fourth embodiment of oxygen regulator according to the invention, in the area referenced V in FIG. 5A, in a first state.
Figure 6B:
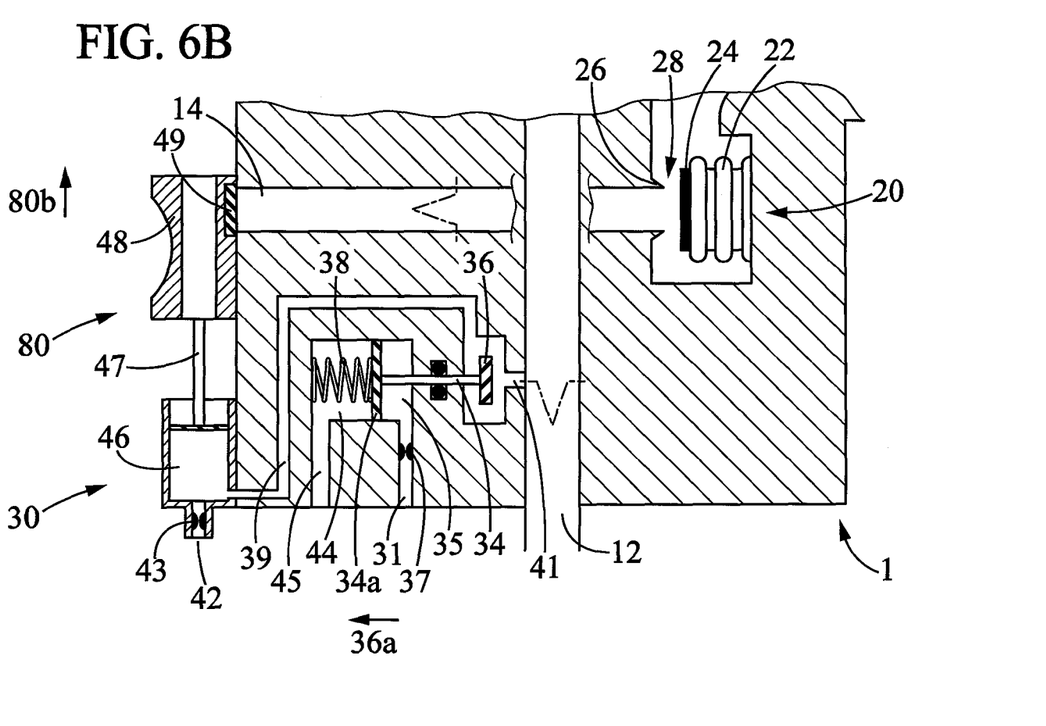
FIG. 6B represents the fourth embodiment of oxygen regulator, in the area referenced V in FIG. 5A, in a second state.

The fourth embodiment of the emergency device 30 shown in FIGS. 6A and 6B differs from the third embodiment shown in FIGS. 5A and 5B in that a chamber 46, a piston 47, an obturator 48 and an elastomeric seal 49 are substituted for the balloon 40. The obturator 48 equipped with the elastomeric seal 49 defines the air inlet closing element 80.

As shown in FIG. 6A, during normal conditions of flight, the variation of the cabin altitude does not induce a pressure on the movable plate 34a higher than the pressure of the return spring 38 in a first gasket direction 36a. Therefore, the gasket 36 closes the high pressure hole 41. So, the feeding duct 39 is not fed with pressurized gas from the source 8, but contains gas at the ambient pressure of the cabin 10. Therefore, the air inlet closing element 80 stays away from the air inlet 14.

As explained above during depressurization, the gasket 36 is away from the high pressure hole 41. Therefore, as shown in FIG. 6B, pressurized breathing oxygen from the source 8 is flowing through the feeding duct 39 and is increasing the pressure in the chamber 46. Thus, the piston 47 and the air inlet closing element 80 move in the second direction 80b. So, the air inlet closing element 80 moves from an opening position in which it authorizes ambient air to flow in the air inlet 14 to a closing position in which it closes the air inlet 14.

After depressurization, the gasket 36 closes the high pressure hole 41 and the pressure in the chamber 46 decreases up to the pressure of the cabin 10. In the embodiment shown in FIGS. 6A and 6B, the air inlet closing element 80 stays in the closing position. In a variant, a return spring may be added to urge the air inlet closing element 80 in the first direction 80a opposite to the second direction 80b.

Figure 7A:
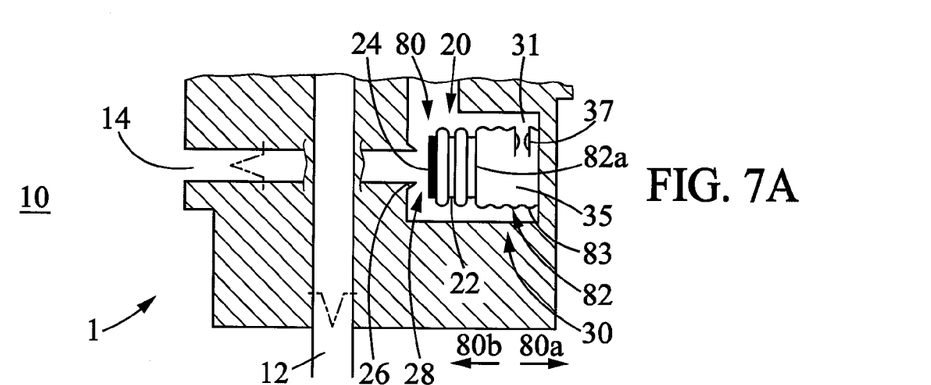
FIG. 7A represents a fifth embodiment of oxygen regulator according to the invention, in the area referenced V in FIG. 5A, in a first state.
Figure 7B:
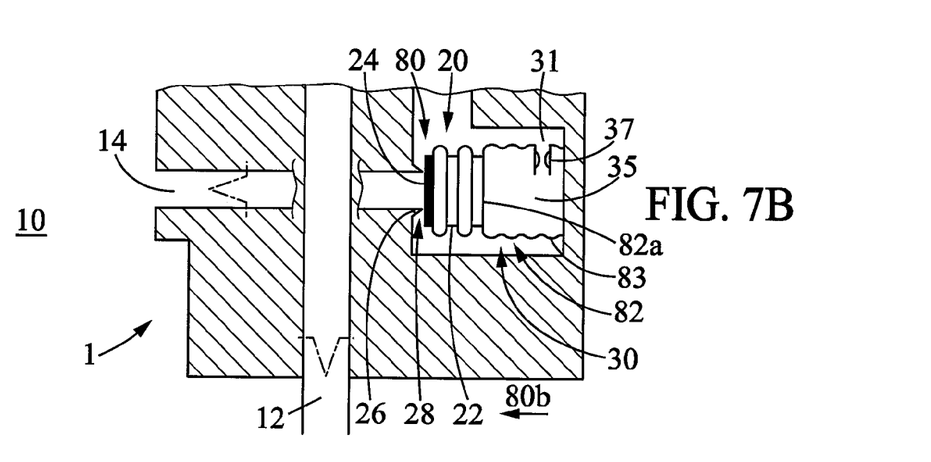
FIG. 7B represents the fifth embodiment of oxygen regulator, in the area referenced V in FIG. 5A, in a second state.

In the fifth embodiment shown in FIGS. 7A and 7B, the emergency device 30 comprises a flexible housing 82 defining a variable volume chamber 35 in communication with ambient air of the cabin through a hole 31 comprising a calibrated constriction 37, and the air inlet 14. In variant, the hole 31 could extend between the variable volume chamber 35 and the ambient air of the cabin 10. Advantageously, the flexible housing 82 comprises a movable part 82a and bellows 83.

The housing 82 is disposed between the gasket 24 of the dilution device 20 and the body 2. So, the dilution device 20 and the emergency device 30 are disposed in series, one beyond the other. In the embodiment illustrated, the housing 82 is disposed between dilution device 20 and the body 2, the movable part 82a being fixed to the aneroid capsule 22. In variant, the aneroid capsule 22 could be disposed between the housing 82 and the body 2, so the movable part 82a would be fixed to the gasket 24. The gasket 24 constitutes the air inlet closing element 80 of the emergency device 30.

The housing 82 is resilient and functionally similar to the rigid housing 32, the piston 34 and the return spring 38 of the oxygen regulator according to the first embodiment.

During normal conditions of flight, the speed of variation of the cabin altitude does not induce a substantial variation of the volume of the variable volume chamber 35. So, during normal conditions of flight, the concentration in oxygen of the breathing mixture provided to the user through the inhalation outlet 16 is regulated by the dilution device 20 and the emergency device 30 has no substantial effect on said concentration.

In case of depressurisation, because of the cabin pressure drop, the volume of the variable volume chamber 35 increases. So, the flexible housing 82 moves the gasket 24 in the second direction 80b, and the passage 28 between the gasket 24 and the seat 26 shrinks. Therefore, the concentration in oxygen of the breathing mixture provided to the user increases. When the increase speed of the cabin altitude is higher than an enrichment threshold, the gasket 24 rests on the seat 26 and the air inlet 14 is closed. Therefore, the inhalation outlet 16 is fed only with breathing oxygen from the source 8.

After depressurization, the variable volume chamber 35 wastes pressure as air flows through the hole 31 with calibrated restriction 37. So, the volume of the variable volume chamber 35 decreases and the gasket 24 moves in the first direction 80a, so that the passage 28 between the gasket 24 and the dilution seat 26 grows. Therefore, the breathing mixture provided to the user is again regulated by the dilution device 20 (as in the normal conditions before depressurization).

The sixth embodiment shown in FIGS. 8A to 8C differs from the first embodiment in that a flexible membrane 82 having a movable part 82a some bellows (extensible gusset) 83 or folds and an annular seal portion 82b is substituted for the piston 34 and the movable part 34a.

Otherwise, the air inlet closing element 80 constituted by the gasket 36 is not mounted on the movable part but on a lever 84 mounted rotatable around an axis lever 85 on the body 2. So, the lever 84 is disposed between the air inlet closing element 80 and the movable part 82a of the flexible membrane 82. As shown in FIG. 8B, a button 86 mounted rotatable around a button axis 88 on the body 2 and having cam portion 87 enables the user to change the mode of the regulator 1. Indeed, when pressing the button 86 the user causes the rotation of the button 86 around the button axis 88 which causes the rotation of the lever 84 around the lever axis 85 due to the cam portion 87 abutting the lever 84. Therefore, the air inlet closing element 80 is moved in a second direction 80b to the closing position in which it closes the air inlet 14.

Otherwise and independently, the sixth embodiment of the regulator 1 differs from the first embodiment in that a filter 90 in porous material is substituted for the calibrated constriction 37 in the hole 31, in order to reduce the flow of air through the hole 31.

During normal conditions of flight, the speed of variation of the cabin altitude does not induce a substantial variation of the volume of the variable volume chamber 35. So, the return spring 38 biasing the lever 84 in a first direction 80a maintains the air inlet closing element 80 in the opening position shown in FIG. 1. Therefore, during normal conditions of flight, the concentration of oxygen in the breathing mixture provided to the user through the inhalation outlet 16 is regulated by the dilution device 20 and the emergency device 30 has no substantial effect on said concentration.

As shown in FIG. 8C, in case of depressurisation, because of the cabin pressure drop, the volume of the variable volume chamber 35 increases. So, the bellows 83 deploy and the movable part 82a moves in the second direction 80b opposite to the first direction 80a. When the increase speed of the cabin altitude is higher than an enrichment threshold, the pressure of the movable part 82a becomes higher than the biasing pressure of the spring 38. Therefore, due the pressure of the movable part 82a, the lever 84 rotates around the lever axis 85 and the air inlet closing element 80 moves in the second direction 80b to the closing position. Thus, the breathing mixture provided to the user through the inhalation outlet 16 is fed only with breathing oxygen from the source 8.

After depressurization, the variable volume chamber 35 wastes pressure as air flows through the hole 31 and the porous filter 90. So, the volume of the variable volume chamber 35 decreases and the air inlet closing element 80 moves in the first direction 80a and comes back to the opening position due to the return spring 38.

In variant, the membrane 82 could be in porous material. Therefore, the function of the filter 90 in porous material should be achieved by the membrane.

In another variant, a spiral spring disposed around the lever axis 85 could be substituted for the helical spring 38 illustrated in FIGS. 8A to 8C.

The invention is not limited to the above described embodiments which are illustrative but not limitative. In particular, instead of a gasket 36, a slider 48 and an inflatable balloon 40, the closing element may also be for example a guillotine device (sliding gate) or a rotary shutter, or the like.

The invention claimed is:

1. An oxygen regulator to deliver breathing gas in a cabin of an aircraft comprising:
   a first inlet for pressurized breathing oxygen,
   a second inlet for diluter gas,
   an outlet to provide a breathing mixture to a user,
   a regulation device adjusting the concentration of breathing oxygen in the breathing mixture,
      wherein the regulation device comprises an emergency device that adjusts the concentration of breathing oxygen in the breathing mixture as a function of a variation speed of the cabin altitude.

2. The oxygen regulator according to claim 1 wherein the emergency device closes the second inlet to provide only breathing oxygen at the outlet above an enrichment threshold of the variation speed of the cabin altitude.

3. The oxygen regulator according to claim 2 wherein the enrichment threshold is higher than 100 m/s.

4. The oxygen regulator according to claim 2 wherein the emergency device opens the second inlet to provide diluter gas at the outlet below a dilution threshold of the variation speed of the cabin altitude.

5. The oxygen regulator according to claim 4 wherein the dilution threshold is equal to the enrichment threshold.

6. The oxygen regulator according to claim 1 wherein the emergency device is pneumatic.

7. The oxygen regulator according to claim 1 wherein the emergency device is of on/off type.

8. The oxygen regulator according to claim 1 wherein the regulation device further adjusts the concentration of breathing oxygen as a function of the cabin altitude.

9. The oxygen regulator according to claim 8 wherein the regulation device further comprises a dilution device distinct from the emergency device which adjusts the concentration of breathing oxygen as a function of the cabin altitude.

10. The oxygen regulator according to claim 1 wherein the emergency device comprises a chamber of variable volume and a restricted communication device between the variable volume chamber and the ambient air of the cabin.

11. The oxygen regulator according to claim 10 wherein the restricted communication device comprises a hole having a section of passage of gas lower than 0.05 square millimeter.

12. The oxygen regulator according to claim 11 wherein the restricted communication device comprises a mobile element to adjust the section of passage of gas through the hole.

13. The oxygen regulator according to claim 10 wherein the restricted communication device comprises a porous material.

14. The oxygen regulator according to claim 10 wherein the emergency device comprises a piston having a movable part separating said variable volume chamber from the air of the cabin.

15. The oxygen regulator according to claim 10 wherein the oxygen regulator comprises a body, the emergency device comprises a flexible housing delimiting the variable volume chamber, the flexible housing has a movable part, and the flexible housing extends between the movable part and the body of the regulator.

16. The oxygen regulator according to claim 15 wherein the flexible housing comprises bellows or folds.

17. The oxygen regulator according to claim 14 wherein:
   the emergency device further comprises a closing element having a closing position in which it closes the second inlet and an opening position in which it allows communication through the second inlet,
   the closing element is mechanically connected to said movable part, so that the movable part moves the closing element from the opening position to the closing position as a function of the variation speed of the cabin altitude.

18. The oxygen regulator according to claim 10 wherein the emergency device comprises an inflatable balloon defining an internal chamber, the variable volume chamber comprises the internal chamber of the balloon, in inflated state the balloon closes the second inlet and in deflated state the balloon enables communication through the second inlet.

19. The oxygen regulator according to claim 10 wherein:
   the regulator comprises a closing element and an amplification device including a high pressure hole, a gasket and a feeding duct,
   is movable between an opening position in which it enables communication between the first inlet and the feeding duct and a closing position in which it prevents communication between the first inlet and the feeding duct,
   the variation of the volume of the variable volume chamber moves the gasket between the closing position and the opening position, and
   the closing element has an opening state in which it does not close the second inlet when the feeding duct is not pressurized and a closing state in which it closes the second inlet when the feeding duct is pressurized.

20. The oxygen regulator according to claim 19 wherein the closing element comprises an inflatable balloon.

21. A breathing mask comprising the oxygen regulator according to any one of claim 1 or 2.

* * * * *